US005337775A

United States Patent [19]

Lane et al.

[11] Patent Number: 5,337,775

[45] Date of Patent: Aug. 16, 1994

[54] DISPENSING TAPS

[75] Inventors: Charles A. Lane, Kingston Upon Thames; Ian D. Woodward, Carshalton Beeches; Derek L. Tyrrell, Rochford, all of Great Britain

[73] Assignee: Waddington & Duval Limited, United Kingdom

[21] Appl. No.: 992,802

[22] Filed: Dec. 18, 1992

[30] Foreign Application Priority Data

Jan. 30, 1992 [GB] United Kingdom .............. 9201993.4

[51] Int. Cl.[5] .......................... F16K 17/40; B67B 7/48

[52] U.S. Cl. .................................. 137/68.1; 137/318; 222/83; 222/509; 251/347; 251/349; 251/354

[58] Field of Search ........................ 137/67, 68.1, 318; 222/5, 80, 81, 83, 83.5, 509, 511, 505, 518; 251/320, 339, 342, 347, 348, 251, 354, 349

[56] References Cited

U.S. PATENT DOCUMENTS

| | | | |
|---|---|---|---|
| 362,804 | 5/1887 | Whomes | 251/251 |
| 2,829,801 | 4/1958 | Ayres | 222/83 |
| 3,298,571 | 1/1967 | Novak | 222/509 |
| 3,759,483 | 9/1973 | Baxter | 251/251 |
| 4,080,965 | 3/1978 | Phillips | 251/342 |
| 4,440,316 | 4/1984 | Christine | 222/83.5 |
| 4,469,249 | 9/1984 | Malpas et al. | 222/83 |
| 4,471,807 | 9/1984 | Lucking et al. | 251/342 |
| 4,475,566 | 10/1984 | Haines | 251/347 |
| 4,475,670 | 10/1984 | Rutter | 222/83 |
| 4,516,691 | 5/1985 | Christine et al. | 222/83.5 |

FOREIGN PATENT DOCUMENTS

| | | | |
|---|---|---|---|
| 0043698 | 7/1981 | European Pat. Off. . | |
| 253447 | 6/1926 | United Kingdom | 251/251 |
| 2096284 | 3/1982 | United Kingdom . | |

*Primary Examiner*—George L. Walton

*Attorney, Agent, or Firm*—Wood, Herron & Evans

[57] ABSTRACT

A dispensing tap for flexible bulk beverage containers comprising a body having an inlet_and an outlet, the axes of which are transverse, a piercer unit carried within the body adjacent the inlet by a shaft and an outlet sealing means comprising a valve element carried on a valve stem, the valve stem and the shaft being operatively connected such that axial movement of the latter towards the inlet causes the valve stem to move transversely to open the outlet.

10 Claims, 1 Drawing Sheet

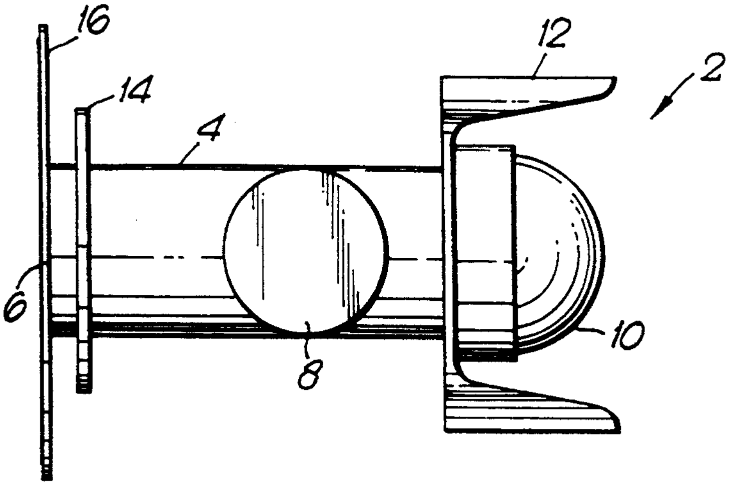
Fig. 1.
Fig. 2.
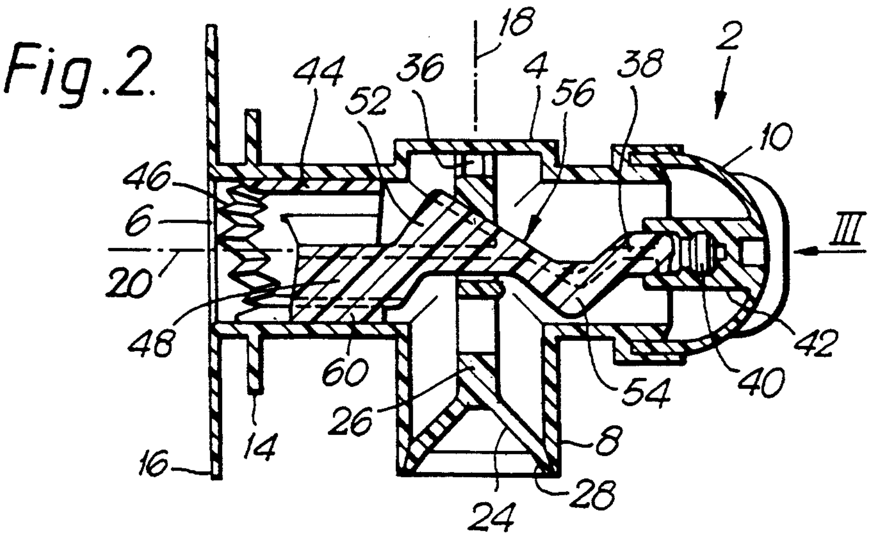
Fig. 3.
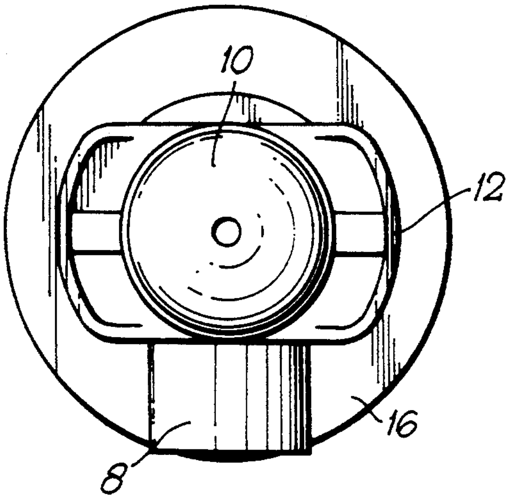
Fig. 4.
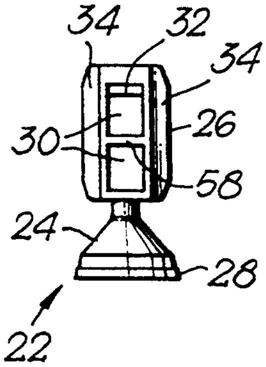
Fig. 5.
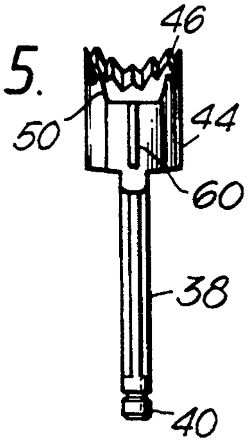

DISPENSING TAPS

This invention relates to taps and valves, in particular to taps and valves for use with bulk containers for liquids.

Bulk containers made from flexible material have become increasingly popular for the storage and marketing of beverages, in particular wine. Taps for such flexible bulk containers are often required to rupture a portion thereof on first operation to allow dispensing of the contents of the container.

One form of tap for such containers is designed to be attached to a wall of the container and to rupture part of that wall. In a second known arrangement, the container is provided with a socket mounted in the wall thereof which includes a flexible membrane for sealing the container. The tap is attached to a socket and is arranged to rupture the flexible membrane on first operation thereof. In a third known arrangement, the tap is also mounted in a socket attached to the wall of the container, but the membrane to be pierced is sealed over the inlet portion of the tap body itself.

With these arrangements, it is important that the bag is not opened, by rupturing a portion of the wall thereof or the sealing membrane, until the contents are to be dispensed in order to keep the contents airtight to avoid deterioration by oxidation. It is also important that the tap be simple to operate and use, or it will meet with consumer resistance, and that it does not become snagged as a result of the rupturing operation.

European Patent Application 0046754 describes a valve for a flexible pouch or bag in which a shaft-bearing piercing head moves within a basically cylindrical valve body. The shaft also carries a valve element which is urged against a seat disposed in the body by a manually compressible cap connected to the shaft, when the cap is in the unactuated state. A drawback of this arrangement is that there is a large area between the valve and the outlet which is exposed to the atmosphere, even when the tap is not in use.

A tap which is said to overcome this drawback is proposed in European Patent Application 0043698. With this tap, the valve element is connected to the shaft by a valve stem inclined to the shaft, axial movement of the shaft within the tap body causing the valve to move towards or away from a correspondingly inclined seat. The valve seat is then able to be located such that, when the valve element is in contact therewith, the stem, the shaft and the piercer unit carried on the shaft are sealed from the atmosphere.

A drawback with both of these and other known "push-button" arrangements is that the closure valve is spaced from the outlet. Liquid can accumulate between the valve and the outlet and the taps are, therefore, susceptible to dripping, which is unacceptable to the consumer. A further problem which has been found in use with known taps is that the sealing thereof is not always effective, due to a lack of positive pressure on the valve when the tap is closed. This can lead to dripping. Furthermore, as a result of efforts to provide adequate sealing, known taps include parts which are relatively difficult to assemble and which, in use, are prone to seizure or locking within the tap body which renders the tap ineffective.

An alternative to push-button taps are the so-called "rotary" taps. In these, the shaft is moved axially by rotation of a cap carried on its head which is attached to the tap body by a screw connection. Rotation of the stem causes it to uncover an aperture provided in the tap body from which liquid is dispensed. If no tubular spout is provided at the aperture, this form of tap will not be susceptible to dripping, provided of course it is correctly operated. However, the lack of a tubular spout means that dispensing therefrom is not always truly vertical, which is preferred. Whether or not provided with a tubular spout, it is believed that the sealing of the tap is not always as effective as that achieved with a valve element which abuts a valve seat and, as noted above, is reliant on correct operation of the tap.

A tap in accordance with the invention comprises a body having an inlet and an outlet, the axes of which are transverse, a piercer unit carried within the body adjacent the inlet by a shaft and an outlet sealing means comprising a valve element carried on a valve stem, the valve stem and the shaft being operatively connected such that axial movement of the latter towards the inlet cause the valve stem to move transversely to open the outlet.

The advantage of this is that it allows an arrangement, which is preferred, wherein the valve element closes the outlet by cooperation with the extremity thereof through which liquid exits the tap. Thus the tap can be truly valved at the outlet, that is, there need be no spacing between the outlet and the valve, with the result that there is no area beyond the valve to retain liquid after dispensing which could then drip.

The outlet may comprise a tubular spout with the valve element cooperating with the extremity thereof through which liquid exits the tap. The tap could, therefore, be attached to commercial dispense systems and is thus suitable not only for home use but also in restaurants and bars.

The shaft may be connected to a resilient cap, manual depression of which causes movement of the shaft towards the inlet. The operative connection of the shaft and valve stem may be such that, when no manual pressure is applied to the cap, the cap positively urges the valve element into sealing contact with the outlet. This ensures that no inadvertent discharge can take place.

In a particularly preferred embodiment, the shaft and the valve stem are operatively connected by cam means. The cam means may comprise at least one angled surface on the shaft, the or one of the angled surface(s) cooperating with an oppositely angled surface provided on the valve stem. With this arrangement, movement of the valve stem and valve element along the outlet axis can be produced as a result of movement of the shaft along the inlet axis, although this is transverse to that of the outlet. By making the shaft and valve stem separate parts, but operatively connecting them, assembly of the tap is facilitated.

The inlet and outlet axes will in general be, respectively, horizontal and vertical in use.

The tap body may be provided with guide means for guiding the movement of the shaft and/or the piercing unit and/or the valve stem and/or the valve element. In particular, the piercing unit and/or valve stem guide means may comprise a pair of oppositely located guide grooves in the body which engage with guide ribs provided on the piercing unit and/or valve stem. The provision of a guide means for the piercing unit ensures that there will be no restraint on the movement of this and that the cam means is always maintained in a vertical plane, as a consequence of which correct operation of the valve is ensured. In the particular case of the valve stem, the guide means ensures that this maintains a true path along its vertical axis which will guarantee good sealing of the outlet and give good quality flow. In the embodiment where a resilient cap is provided, the cap will, therefore, always pull back the shaft and provide positive pressure on the valve element.

The invention will now be further described by way of example with reference to the accompanying drawings in which:

FIG. 1 is a plan view of a tap in accordance with the invention;

FIG. 2 is a section taken on the centre line of the tap of FIG. 1;

FIG. 3 is an end view taken in the direction of Arrow III of FIG. 2;

FIG. 4 is a side view of the outlet sealing means of the tap of FIG. 1; and

FIG. 5 is a side view of the stem and piercing unit of the tap of FIG. 1.

The tap 2 comprises a body 4 having an inlet end 6 and an outlet 8. The body 4 extends from the inlet end 6 across the outlet 8 and is closed at its other end by a resilient cap 10. The body 4 may be formed from any suitable material, such as high density polyethylene, low density polyethylene or linear low density polyethylene. The cap 10 needs to be resilient but flexible so that it is capable of large deformation under manual pressure but of subsequently resuming its original shape when the pressure is removed. The cap 10 is suitably formed from elastomeric polymer, for example ethylene vinyl acetate or polybutyleneterephthlate.

The body 4 defines protective wings 12 for the cap 10 positioned so as to provide finger pressure points for actuation of the cap 10 by the thumb. In the illustrated form, the body 4 includes two flanges 14 and 16 at the inlet end 6 spaced apart sufficiently to receive therebetween the end portion of a box 4 containing a flexible liquid container with which the tap 2 is to be used. The flange 16 will be heat-sealed to the wall of the flexible container. Alternatively, if the container was of the type provided with a socket, the socket being attached by heat-sealing a flange thereof to the container wall, the inlet end 6 would be arranged to mate with the socket. For this purpose, the flange 16 would be omitted and the flange 14 positioned approximately midway along the tubular inlet end 6 of the body 4. The section of the tubular inlet end 6 forward of the flange 14 would be formed with ribs dimensioned to form a snap-fit with the socket and the mouth of the inlet end 6 would be sealed with a membrane.

The outlet 8 comprises a tubular spout, the axis of which 18 is transverse to that 20 of the inlet 6 and tap body 4. Outlet sealing means 22 is provided comprising a valve element 24 carried on a valve stem 26. The outlet sealing means can be formed from any suitable polyolefin, such as high-density polyethylene, low-density polyethylene or polypropylene. The valve element 24 is frustro-conical and has a flared mouth 28 which, when the tap 2 is closed, seats at the annular edge of the tubular spout outlet 8 to seal the outlet 8. Thus the tap 2 provides for a truly vertical dispense therefrom. Furthermore, it is truly valved at the outlet, that is there is no gap between the valve and the outlet where liquid could be retained when dispensing ceases, which would subsequently form drips.

The valve stem 26 is rectangular and includes two rectangular holes 30 therein, the upper edge 32 of the upper hole 30 slopes from one face of the valve stem 26 to the other, the reasons for which are discussed below. Guide ribs 34 are provided on both faces of the valve stem 26 at either side of the holes 30 therein. Guide ribs 34 engage in use with guide grooves 36 provided in the body 4. This engagement, of the guide ribs 34 and the guide grooves 36, ensures that movement of the outlet sealing means 22 is always along a straight line, in particular, along the axis 18 of the outlet 8. Proper sealing of the outlet 8 will, therefore, always result and maintenance of the valve element 24 truly central in the outlet 8 gives good quality flow therefrom.

The outlet sealing means 22 is retained within the body 4 by a shaft 38 which passes through the upper hole 30 of the valve stem 26. The shaft 38 may be formed from, for example, polystyrene or polypropylene. At one end, the shaft 38 is connected to the resilient cap 10 by snap-fitting the head 40 thereof into a suitably shaped socket provided in a stem 42 which extends down from the concave surface of cap 10. At its other end, the shaft 38 carries a piercing unit 44 which, in the illustrated arrangement, consists of a cylindrical body with a saw-tooth edge 46 connected between the shaft 38 and piercing unit 44 and comprises three equi-angularly spaced flanges 48 which extend from the shaft to the inner face of the cylindrical body of the piercing unit 44.

In use, as discussed above, the inlet end 6 of the tap 2 is connected to the wall of a flexible container or to a membrane gland. Manual depression of the cap 10 will cause the shaft 38 to move axially within the tap body 4 which will take the piercing unit 44 outside of the body 4 and into contact with the container wall or membrane gland film which it will rupture along a path defined by the saw-tooth edge 46. To prevent complete detachment of the ruptured portion of the container wall or film, as applicable, the piercing unit is provided with a cutout 50 with smoothly rounded edges which will not cut through the container wall or film. Thus there will be no section of wall or film floating in the container or possibly entangled with the piercing unit 46. The cutout 50 further acts to push back the ruptured section of the container wall or film, around the connection thereof to the remainder of the container wall or film produced by the cutout 50, on subsequent depressions of the cap 10 to prevent this impeding fluid flow.

The piercing unit could be provided with a different type of cutting edge 46. One which is preferred consists simply of three points. Alternatively, the piercing unit 44 could be in the form of a conical piercing head.

The shaft 38 has two integral oppositely directed triangular projections 52 and 54. Triangular projection 52 is located within the upper hole 30 when the tap 2 is closed. The edge 56 of the triangular projection 52 which then abuts the upper edge 32 of the hole 30 is provided with a corresponding slope to that edge 32. These correspondingly sloping edges 32, 56 constitute a cam which transmits movement of the shaft 38 along the inlet axis 20 away from the inlet end 6 into movement of the valve stem 26 and valve element 24 along the transverse outlet axis 18 to pull the valve stem 26 up and bring the valve element 24 into sealing contact with the extremity of the outlet 8. The second triangular projection 54 transmits movement of the stem 38 along the inlet axis 20 towards the inlet end 6 into movement of the valve stem 26 and valve element 24 along the transverse outlet axis 18 to move the valve element 24 outwardly to form an annular passage around the element 24 through which fluid can flow. This unsealing of the outlet 8 is achieved by abuttal of the second triangular projection 54 against the web 58 between the two holes 30 of the valve stem 26.

Manual depression of the cap 10 to move the shaft 38 towards the inlet end 6 will, therefore, unseal the outlet 8. Release of pressure on the cap 10 will, as a result of its resilience, draw back the shaft 38 within the body 4 and lift the valve element 24 back into sealing contact with the outlet 8 so stopping liquid flow from the tap 2. The cap 10 is arranged so that-in the relaxed, i.e., non-pressurised state, it will provide a positive pressure transmitted by the cam, constituted by sloping edges 32 and 56, on the sealing means 22. The movement of the valve stem 26 will be facilitated in both cases by the engagement between the guide ribs 34 and guide grooves 36. In order to make sure that the piercing unit 44 is not restrained from moving back into the body 4 when pressure on the cap 10 is released, it is preferably also provided with a guide rib 60 which engages a guide groove appropriately placed in the body 4 at the inlet end 6 thereof.

The tap 2 gives truly vertical and good quality flow of liquid. It has a positive seal at the extremity of its outlet and so will not drip. It is simple in operation and, in particular, is actuated by the same action for the first piercing step as for all other dispenses.

We claim:

1. A tap comprising
 a body having an inlet and an outlet, the axes of said inlet and outlet being transverse relative one to the other,
 a piercer unit carried within said body adjacent said inlet,
 a shaft to which said piercer unit is connected at one end, the other end of said shaft being manually engageable directly so as to move said shaft in one direction along said inlet axis in order to activate said piercer unit, and
 an outlet sealing means comprising a valve element connected to a valve stem for sealing an outlet passageway, said valve stem being operable in one direction along said outlet axis to open said tap, said valve stem and said shaft being operatively connected for relative movement with respect to one another such that axial movement of said shaft towards said inlet in response to a manual force acting directly on said other end of said shaft along said inlet axis causes said valve stem to move transversely to said shaft in order to open said outlet as said valve stem moves along said outlet passageway.

2. A tap as claimed in claim 1, said body comprising
 an extremity thereof through which liquid exits said tap, said valve element being adapted to close said outlet by cooperation with said extremity.

3. A tap as claimed in claim 2, said outlet comprising
 a tubular spout, said valve element cooperating with the end thereof through which liquid exits the tap.

4. A tap as claimed in claim 1, said tap comprising
 a resilient cap connected to said shaft at said other end, manual depression of said cap causing movement of said shaft towards said inlet.

5. A tap as claimed in claim 4, the operative connection of said shaft and said valve stem being such that said resilient cap positively urges said valve element into sealing contact with said outlet when no manual pressure is applied to said resilient cap.

6. A tap as claimed in claim 4, said tap comprising
 guide means on said body for guiding the movement of at least one of said shaft, said piercer unit, said valve stem, and said valve element along its respective inlet or outlet axis.

7. A tap as claimed in claim 6, said guide means for at least one of said piercer unit and said valve stem comprising
 a pair of oppositely located guide grooves defined in said body, and
 a pair of oppositely located guide ribs provided on one of said piercer unit and said valve stem, said guide ribs being slidable in said guide grooves.

8. A tap as claimed in claim 1, said tap comprising
 cam means for operatively connecting said shaft and said valve stem, said cam means being disposed on said shaft and said valve stem and operative to move said valve stem along said outlet axis as said shaft is moved along said inlet axis.

9. A tap as claimed in claim 8, said cam means comprising
 at least one angled surface on said shaft adapted to cooperate with a differently angled surface on said valve stem.

10. A tap as claimed in claim 1 wherein said inlet axis and said outlet axis are perpendicular to one another.

* * * * *